(No Model.)
J. W. D. FIFIELD.
CRIMPING MACHINE FOR BOOTS OR SHOES.
No. 261,917. Patented Aug. 1, 1882.
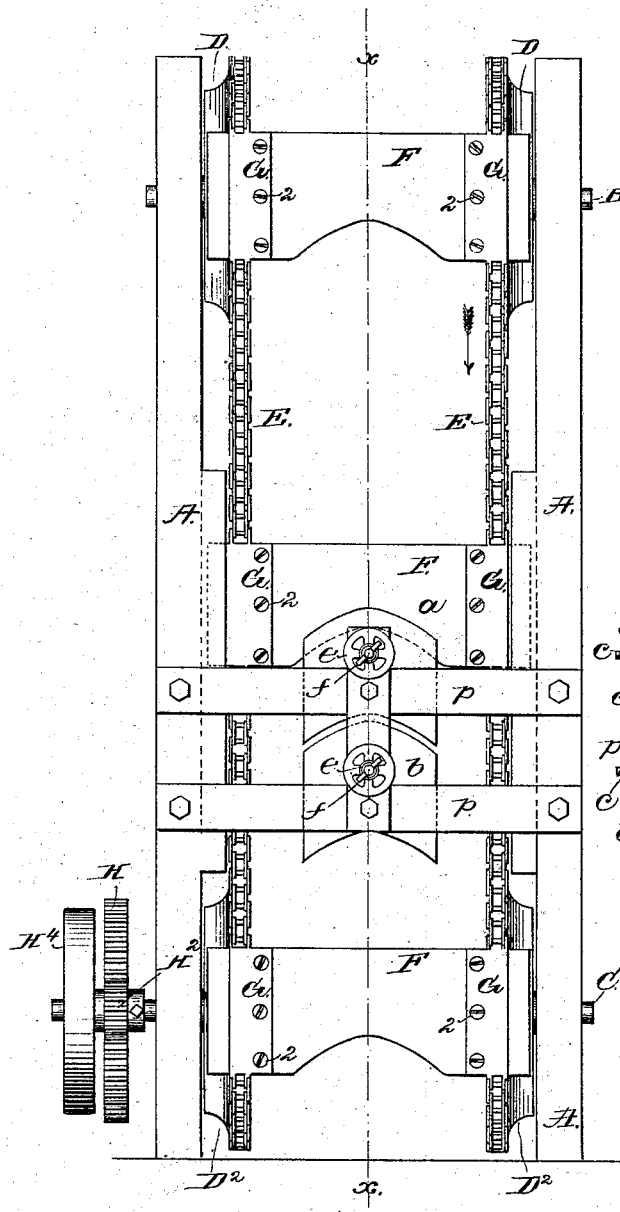
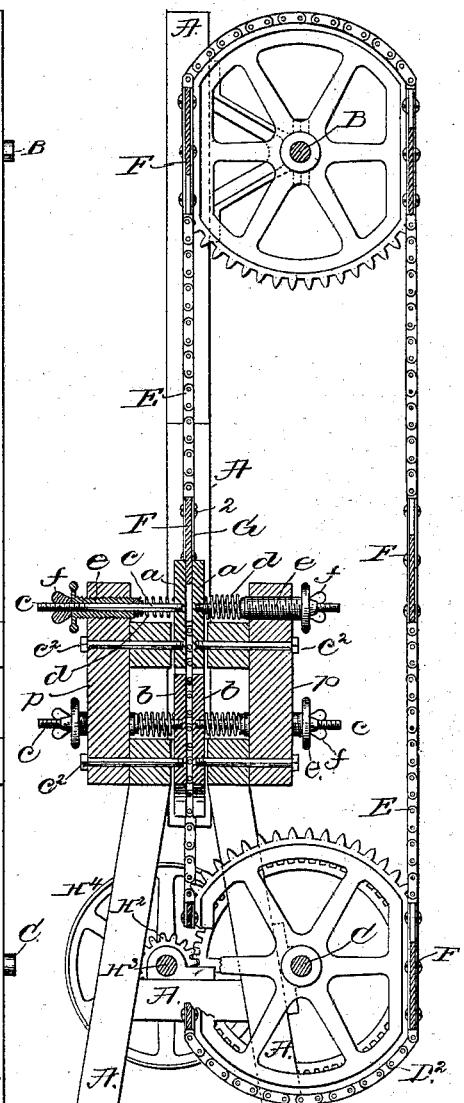
Witnesses.
John F. C. Prein...
Fred A. Powell
Inventor.
John W. D. Fifield
By Crosby & Gregory attys.

UNITED STATES PATENT OFFICE.

JOHN W. D. FIFIELD, OF NORTH BROOKFIELD, MASSACHUSETTS, ASSIGNOR TO THE STODDARD CRIMPING MACHINE COMPANY.

CRIMPING-MACHINE FOR BOOTS OR SHOES.

SPECIFICATION forming part of Letters Patent No. 261,917, dated August 1, 1882.

Application filed June 8, 1882. (No model.)

*To all whom it may concern:*

Be it known that I, JOHN W. D. FIFIELD, of North Brookfield, county of Worcester, State of Massachusetts, have invented an Improvement in Upper-Crimping Machines for Boots or Shoes, of which the following description, in connection with the accompanying drawings, is a specification.

My invention consists essentially in an organized crimping-machine in which the forms, connected at each end and moved by two flexible or chain-like carriers, are passed one after the other between crimping-jaws supported in a yielding manner, so as to adapt themselves to variations in thickness of the stock.

Figure 1 represents in side elevation a crimping-machine embodying my invention, and Fig. 2 a vertical section thereof on the dotted line $x\ x$.

The frame-work A has suitable brackets or bearings to sustain the shafts B C of the sprocket wheels or drums $D\ D^2$, which receive about them the form-carriers E, (herein shown as two parallel open-linked chains,) having metal plates G, which are suitably attached to the crimping-forms F, as would be the case were the forms connected with the chain only at one end and extended radially from the axis of shaft B; and I do not therefore broadly claim an endless chain or belt at but one end of the form, as I know that to be old. In my invention the edges of the forms are parallel with the shafts B C, having the wheels over which the carriers E are passed, screws 2 being shown in the drawings for that purpose.

The shaft C has upon it a gear, H, which is engaged to drive the said shaft and the two chains or carriers E by the pinion $H^2$ on the shaft $H^3$, having on it any usual belt pulley or pulleys, $H^4$.

The sprocket-wheels $D\ D^2$ are shown as provided with two flat faces (see Fig. 2) at opposite sides to permit the passage about the said wheels of the plates G and forms, the distance from center to center of the plates G determining the diameter of the sprocket-wheels.

The two pairs of jaws $a\ a\ b\ b$ are supported in suitable or usual manner by rods $c\ c^2$. The rod $c$, attached to the jaw, is extended loosely through an adjustable tubular nut, $e$, held in a rigid part of the machine, and then through a spiral or other spring, $d$, interposed between the end of the nut $e$ and the jaw, so that the jaw may yield more or less, according to the adjustment of the nut $e$. The inward movement of the jaws toward each other is regulated by the thumb-nuts $f$. The cross-pieces $p\ p$ serve to sustain the jaws $a\ b$.

The forms may be of any usual shape, and, being connected with the carriers at each end, are moved positively and uniformly and cannot tip.

The carriers are moved continuously in one direction, and after passing below the lowermost pair of jaws the crimped upper may be removed in any usual way.

I claim—

In a crimping-machine, the two carriers E and a series of crimping-forms connected therewith at each end, and sprocket wheels or drums to move the carriers and forms, combined with crimping-jaws to operate substantially as described, the edges of the said forms being arranged parallel with the shafts of the wheels which support the said carriers.

In testimony whereof I have signed my name to this specification in the presence of two subscribing witnesses.

JOHN W. D. FIFIELD.

Witnesses:
W. H. HOLT,
FRANK WARE.